No. 812,339. PATENTED FEB. 13, 1906.
J. HAPPEL.
WAGON BRAKE.
APPLICATION FILED AUG. 24, 1905.
2 SHEETS—SHEET 2.
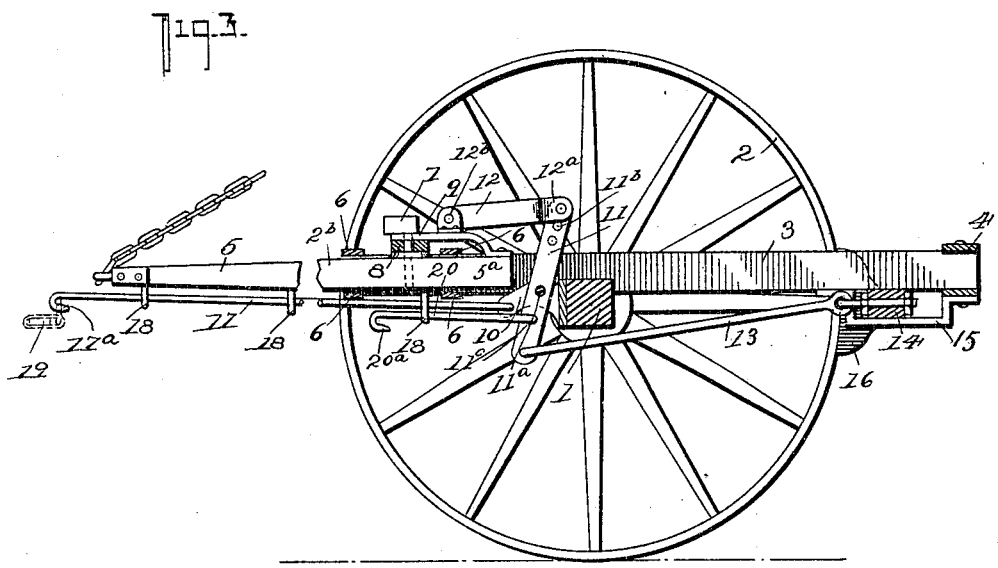
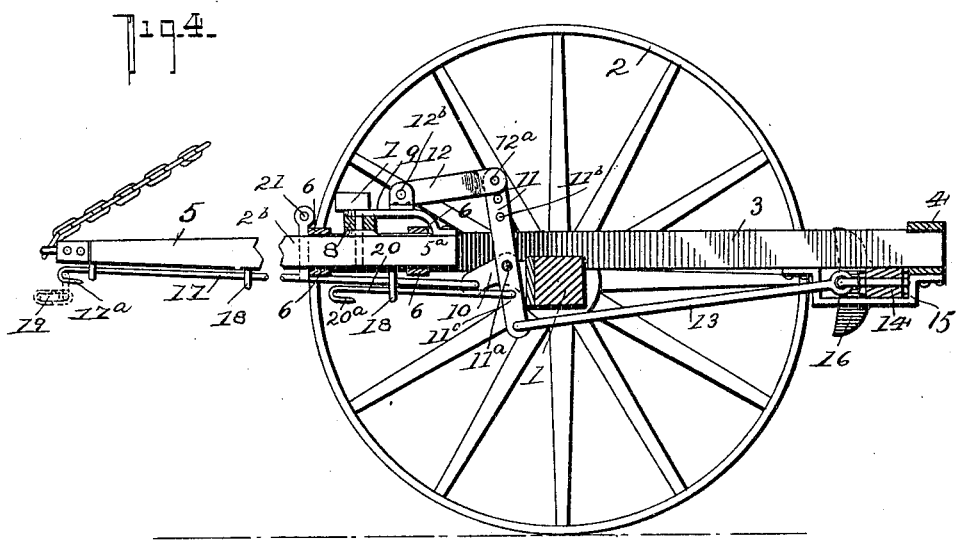
WITNESSES:
M. R. Taylor
John J. Ockrott
INVENTOR
Jacob Happel.
BY
Fred G. Dieterich
ATTORNEYS.

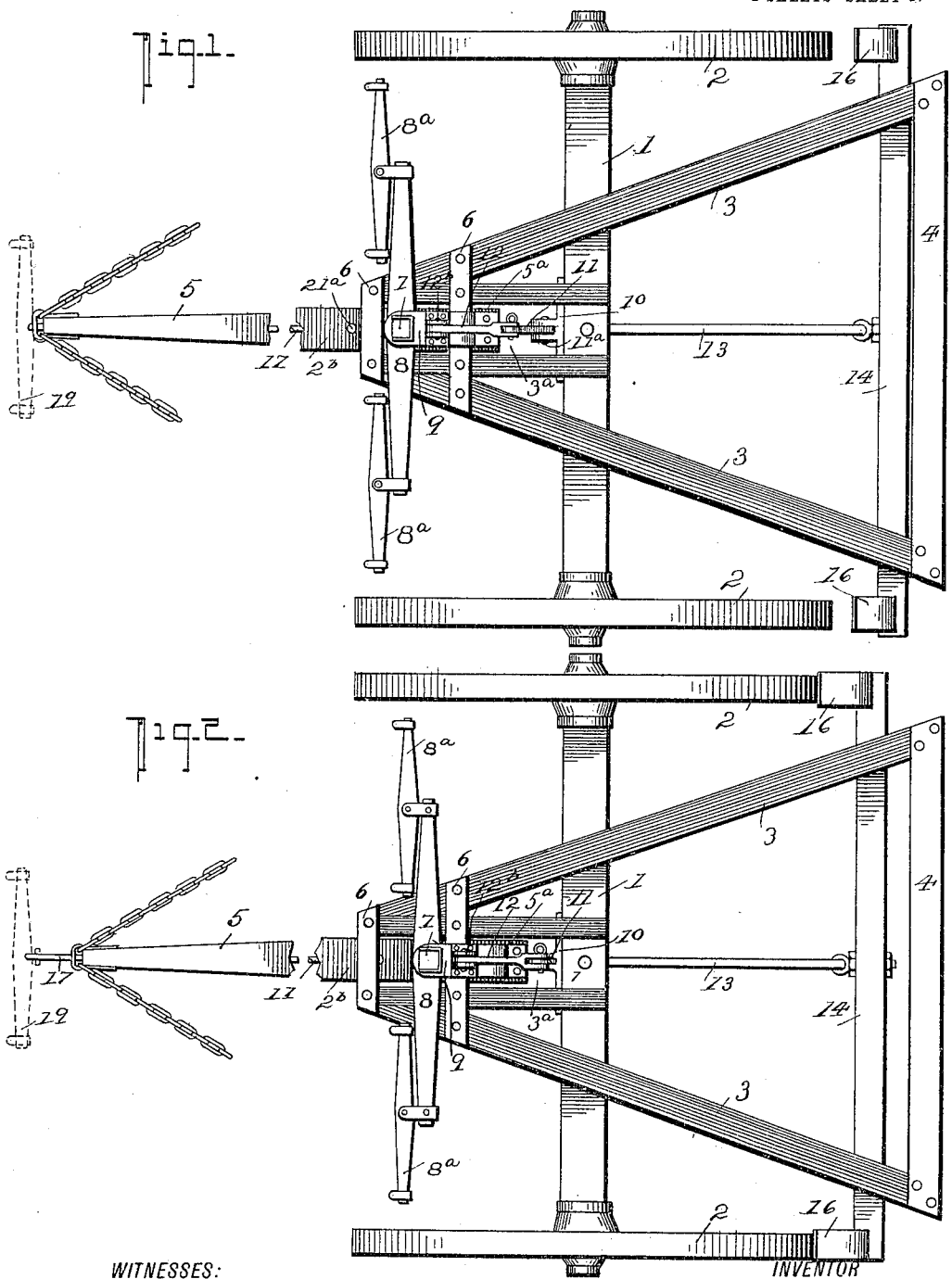

ns of the following is a specifica-

UNITED STATES PATENT OFFICE.

JACOB HAPPEL, OF ANCHORAGE, KENTUCKY.

WAGON-BRAKE.

No. 812,339.     Specification of Letters Patent.     Patented Feb. 13, 1906.

Application filed August 24, 1905. Serial No. 275,591.

*To all whom it may concern:*

Be it known that I, JACOB HAPPEL, residing at Anchorage, in the county of Jefferson and State of Kentucky, have invented certain new and useful Improvements in Wagon-Brakes, of which the following is a specification.

My invention relates to certain new and useful improvements in wagon-brakes of the automatic self-operating type in which means are provided for automatically applying the brake as the vehicle goes down hill or as the horses exert a back pressure on the vehicle.

Generically, my invention comprises a wagon-pole so attached to the wagon-truck as to have limited forward and backward motion with respect to the truck, a brake-beam having brake-shoes for applying brake-power to the front wheels of the truck, and lever connections between the brake-beam and the pole whereby the motion of the pole will operate the brake-beam to apply the brakes to the wheels.

Again, my invention seeks to provide means operating in conjunction with the mechanism just referred to for attaching a third horse to the vehicle in such a manner as to not interfere with the application of the brake by the wheel-horses, and also to provide means operating in conjunction with the brake mechanism for securing the brake when the vehicle is at rest, so that any forward motion of the horses in starting up prematurely will apply the brake and stop the vehicle.

Primarily, my invention has for its object to provide a device of this character of a very simple and effective construction which can be easily and cheaply manufactured and which will readily and effectively serve its intended purposes.

With other objects in view than have heretofore been specified the invention also comprises certain novel construction, operation, and correlative arrangement of parts, all of which will be first described in detail and then specifically pointed out in the appended claims, reference being had to the accompanying drawings, in which—

Figure 1 is a top plan view of my invention, showing the brake released. Fig. 2 is a similar view showing the brake in its applied position. Fig. 3 is a central vertical longitudinal section of Fig. 1, parts being shown in elevation. Fig. 4 is a view similar to Fig. 3, showing the manner of applying the stop-pin to prevent operation of the brake during backing of the vehicle.

Referring now to the accompanying drawings, in which like numerals of reference indicate like parts, 1 designates the front axle, upon which the wheels 2 2 are mounted in the usual manner, and the axle 1 has the usual longitudinal hounds 3 3 secured thereto in the usual manner, a brace-beam 4 being provided at the rear thereof to connect the hounds 3 3 together and brace the same, as shown. At the front end the hounds 3 3 are spaced sufficiently apart to form a channel-way $3^a$ to receive the rear end $5^a$ of the tongue 5, held in place by the cross-bars 6 6, secured to the hounds 3 3 above and below the same to bridge the channel $3^a$ and the tongue end $5^a$, as shown.

7 designates the hammer-pin, to which the doubletree 8 is fulcrumed, and the hammer-pin 7 is provided with the usual hammer-strap 9, secured thereto and to the rear of the tongue 5.

10 designates a bracket secured centrally to the axle 1, in which a vertical lever 11 is fulcrumed, as at $11^a$, and the lever 11 has its upper portion provided with a plurality of apertures $11^b$ $11^b$ to adjustably receive the rod end $12^a$ of the rod 12, which is also pivotally secured at its end $12^b$ to the hammer-strap 9, as shown.

Below the fulcrum-point $11^a$ of the lever 11 a rod 13 is secured, and the rod 13 is secured to the brake-beam 14, which is slidable on the hounds 3 3 and held in position by the straps or irons 15 15, secured thereto. The brake-shoes 16 16 are secured to the beam 14 at its ends in any approved manner.

Fastened to the bracket 10 is a rod 17, which extends through eyes 18 18 on the under side of the tongue 5 to the front end of the tongue and terminates in the hook $17^a$, to which the swingletree 19 (see dotted lines, Figs. 1, 2) for the third horse may be secured, so that such third horse will be able to assist in pulling the load without interfering with the ready and effective application of the brake devices by the wheel-horses. Secured to the lower end $11^c$ is a short rod 20, which passes through an eye 18 on the under side of the tongue 5 and terminates in the hook end $20^a$ at a point approximately in alinement with the swingletrees $8^a$ $8^a$ of the doubletree 8, so that when the vehicle is at rest one or more of the horses' traces can be secured to the rod 20 to apply the brake should the horses start up unnecessarily or when not desired.

So far as described the manner in which my invention operates will be best explained as follows: As the vehicle is being drawn along by the horses the tongue is at the forward limit of its movement, the hammer-pin 7 engaging the front cross-bar 6 to limit the movement of the tongue in the forward direction. In this position also the lever 11 is in its forward position (shown in Fig. 1) and the brake is released from the wheels. Now should it be desired to stop the vehicle, as the driver draws on the reins to stop the horses the back pull thereof will serve to push the tongue to its rearward position, thus applying the brake, as clearly shown in Fig. 3. The brake is automatically applied in the same manner as the vehicle descends hills, it being understood that if a third horse is hooked to the rod 17, as before stated, it will not interfere with the application of the brake. Should it be desired to back the vehicle or to disconnect the brake devices from operative connection, it is only necessary to insert a cotter-pin 21 in the aperture $21^a$ in the tongue 5, as this will abut the front cross-bar 6 and prevent rearward movement of the tongue, thus locking the tongue from movement in either forward or rearward direction and throwing the brake mechanism out of operation.

From the foregoing description, taken in connection with the accompanying drawings, it is thought the complete construction, operation, and many advantages of my invention will be readily understood by those skilled in the art to which it appertains, and I desire to say that many slight changes in the detailed construction, operation, and design of parts may be made without departing from the scope of the invention or the appended claims.

Having thus described my invention, what I claim, and desire to secure by Letters Patent, is—

1. A mechanism of the class described, comprising in combination with the wheeled axle, hounds secured thereto with their front ends spaced apart to form a channel, bridge-pieces secured to said hounds to bridge said channel, a tongue mounted between said bridge-pieces and said hounds in said channel and capable of longitudinal movement, a hammer-pin and a cross-tree secured to said tongue, a hammer-strap secured to said tongue and said hammer-pin, a lever pivotally secured to said axle, a rod connecting one end of said lever with said hammer-strap, a brake-beam having brake-shoes slidably mounted on said hounds, a rod connecting said brake-beam to the other end of said lever, a second rod secured to said other end of said lever and passing along the under side of the tongue, said second rod having a hook for engaging with the traces of the harness at times, substantially as shown and described.

2. A mechanism of the class described, comprising in combination with a wheeled axle, hounds secured thereto with their front ends spaced apart to form a channel, bridge-pieces secured to said hounds to bridge said channel, a tongue mounted between said bridge-pieces and said hounds in said channel and capable of longitudinal movement, a hammer-pin and a cross-tree secured to said tongue, a hammer-strap secured to said tongue and said hammer-pin, a lever pivotally secured to said axle, a rod connecting one end of said lever with said hammer-strap, a brake-beam having brake-shoes slidably mounted on said hounds, a rod connecting said brake-beam to the other end of said lever, a second rod secured to the other end of said lever and passing along the under side of the tongue, said second rod having a hook for engaging with the traces of the harness at times, a third rod secured to said axle, and passing under said tongue and extending to the front thereof, means for securing a supplemental tree to said third rod, to which a third horse may be secured without interfering with the operation of the pivoted lever and the tongue, all being arranged substantially as shown and described.

3. A mechanism of the class described, comprising in combination with a wheeled axle, hounds secured thereto with their front ends spaced apart to form a channel, bridge-pieces secured to said hounds to bridge said channel, a tongue mounted between said bridge-pieces and said hounds in said channel and capable of longitudinal movement, a hammer-pin and a cross-tree secured to said tongue, a hammer-strap secured to said tongue and said hammer-pin, a lever pivotally secured to said axle, a rod connecting one end of said lever with said hammer-strap, a brake-beam having brake-shoes slidably mounted on said hounds, a rod connecting said brake-beam to the other end of said lever, a second rod secured to the other end of said lever and passing along the under side of the tongue, said second rod having a hook for engaging with the traces of the harness at times, a third rod secured to said axle, and passing under said tongue and extending to the front thereof, means for securing a supplemental tree to said third rod, to which a third horse may be secured without interfering with the operation of the pivoted lever and the tongue, and means for locking said tongue from longitudinal movement at times, substantially as shown and described.

JACOB HAPPEL.

Witnesses:
C. L. DUFF,
W. P. PEARCY.